May 15, 1962  L. A. AMTSBERG  3,034,623
CAM CLUTCH DEVICE
Filed July 30, 1956  5 Sheets-Sheet 1
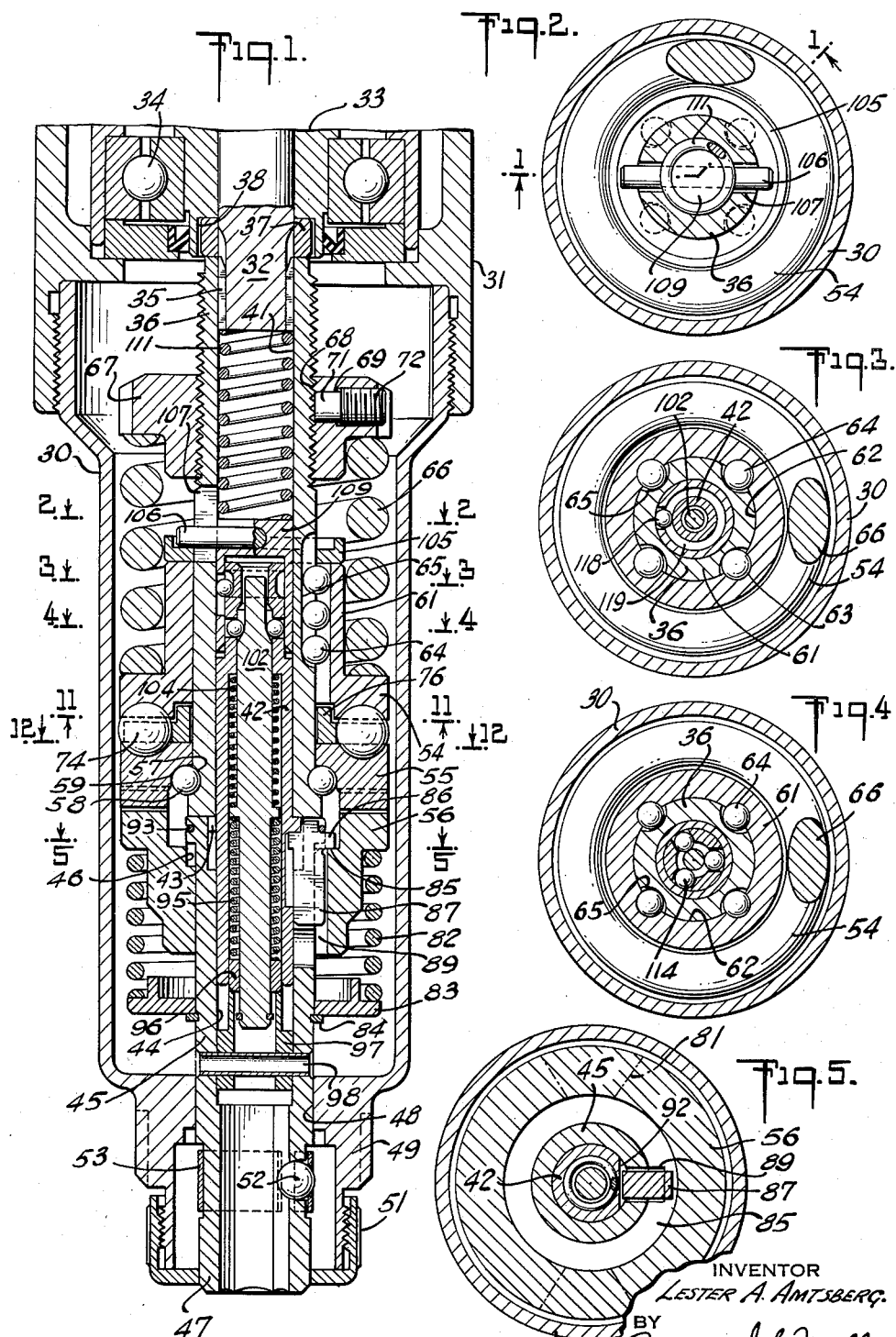
INVENTOR
LESTER A. AMTSBERG.
BY
Raymond G. Mullee
ATTORNEY

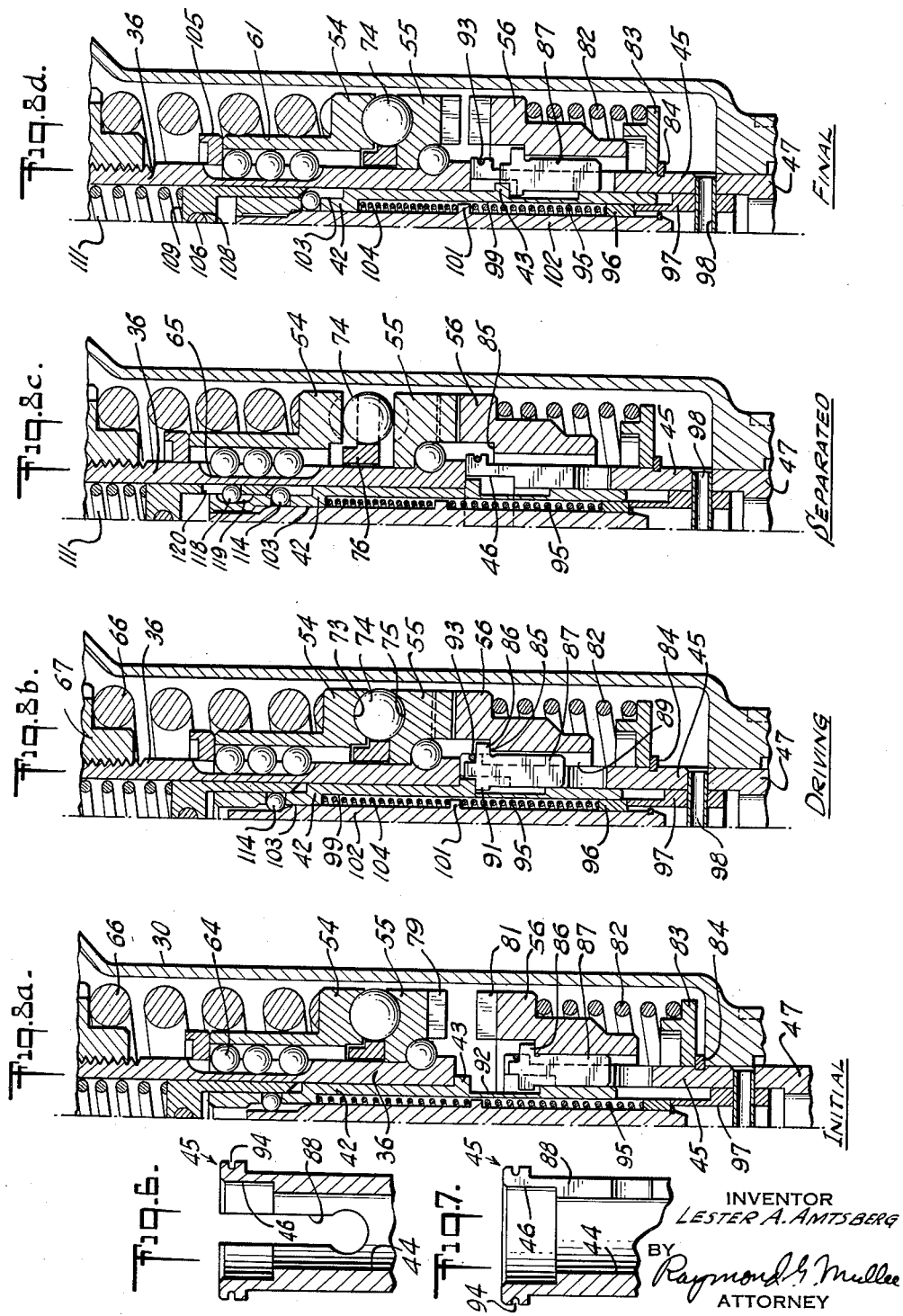

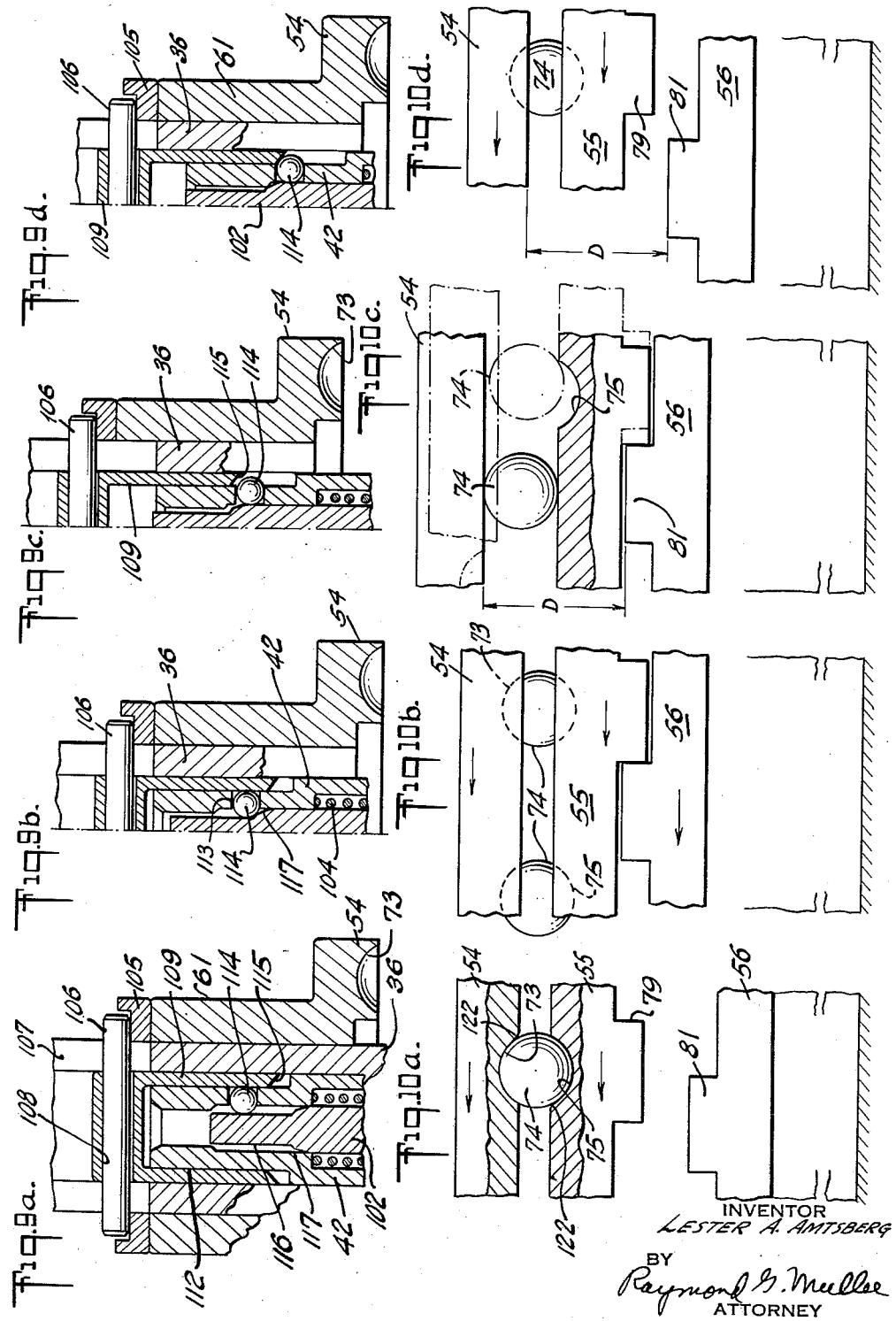

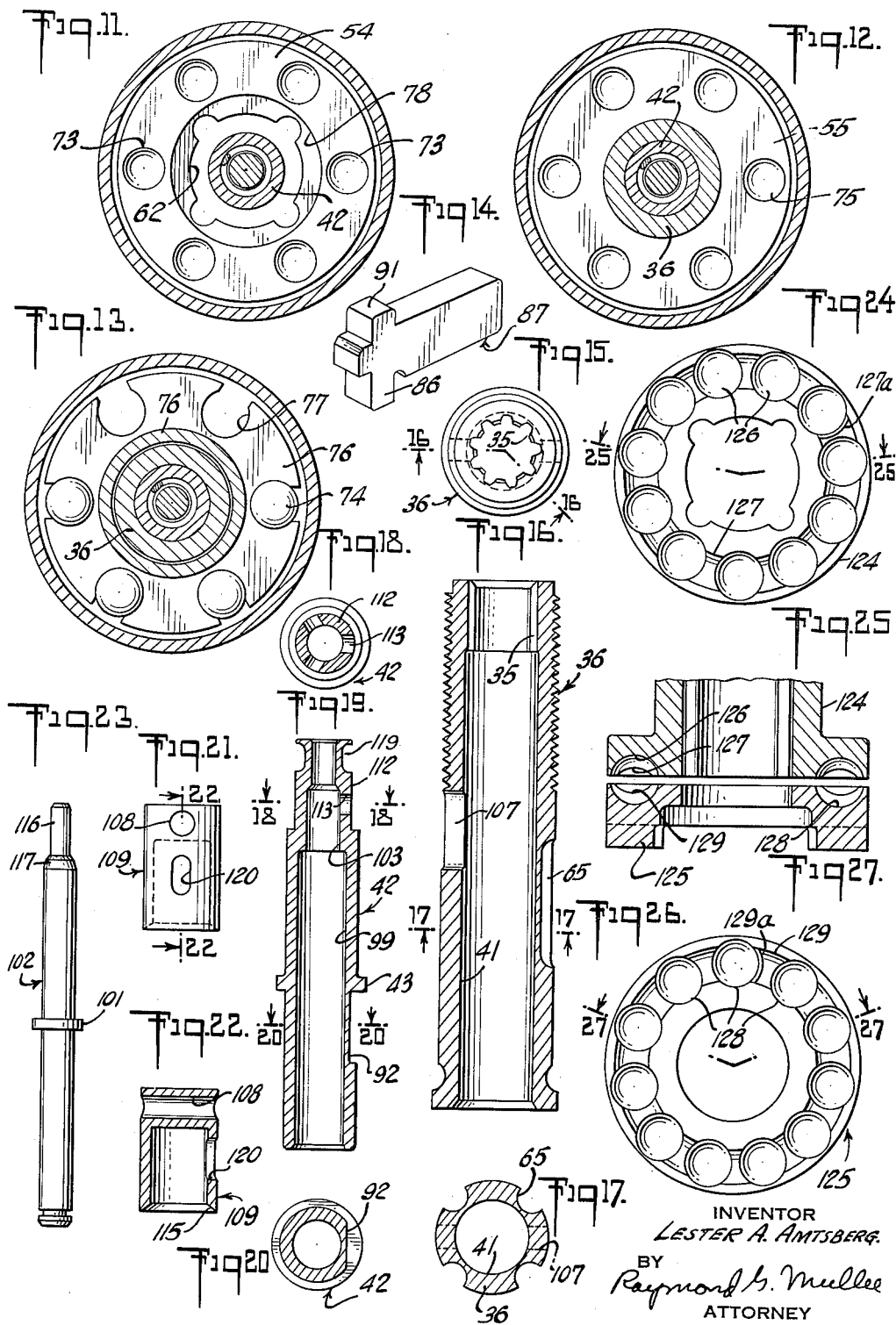

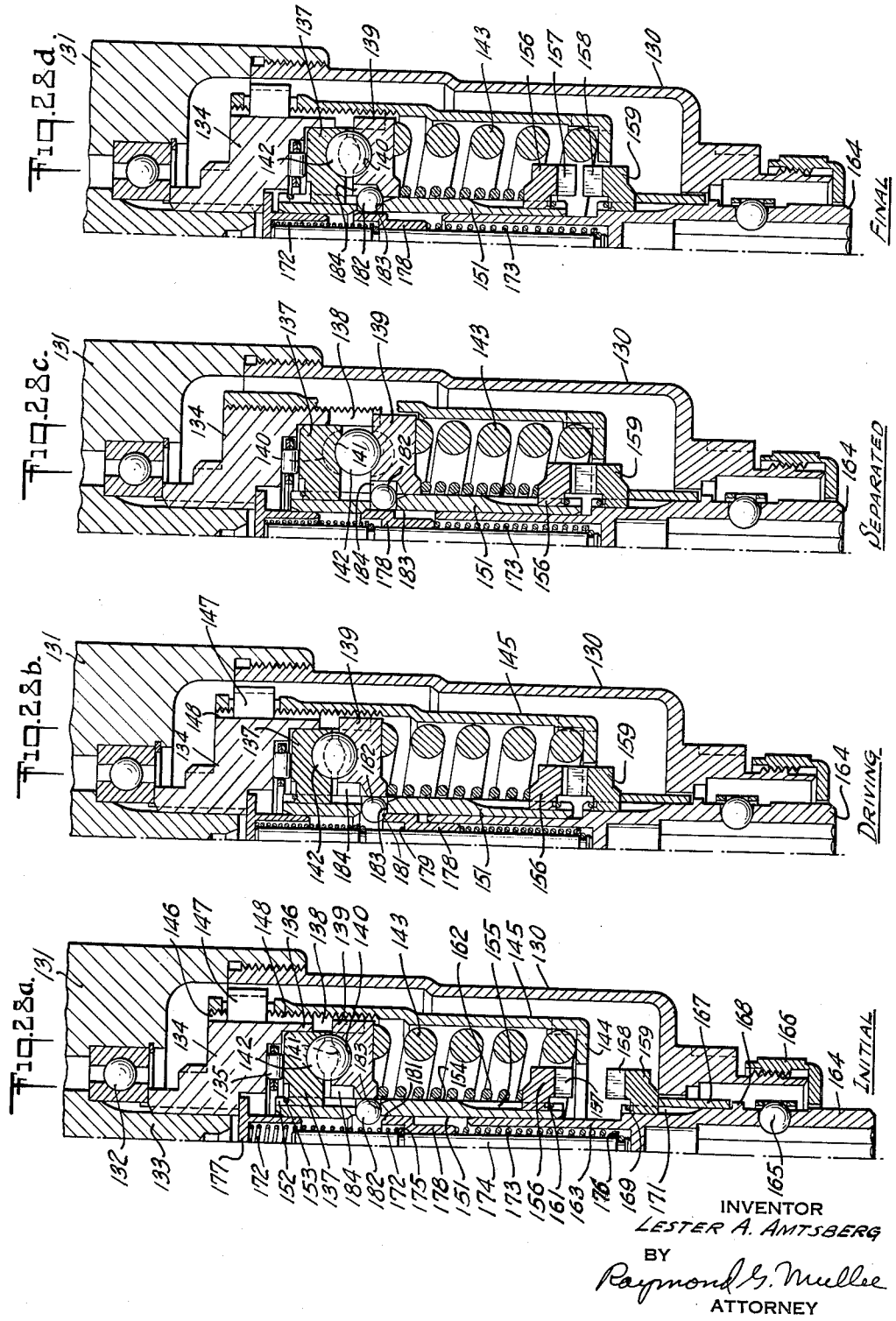

3,034,623
CAM CLUTCH DEVICE
Lester A. Amtsberg, New Hartford, N.Y., assignor to Chicago Pneumatic Tool Company, New York, N.Y., a corporation of New Jersey
Filed July 30, 1956, Ser. No. 600,876
25 Claims. (Cl. 192—56)

This invention relates to torque responsive clutch devices and has particular application to power operated tools for driving bolts, nuts, screws, studs and the like to the desired degree of tightness.

The usual pneumatic or electric screw driver includes a jaw clutch normally separated by spring pressure but engaged upon application of manual pressure, the jaw clutch being driven by an automatic clutch which releases upon attainment of a predetermined torsional stress. Usually the automatic clutch is spring engaged and cam disengaged with the result that it repeatedly re-engages to deliver a series of torsional impacts exceeding the predetermined torque limit, thus requiring considerable skill on the part of the operator in removing the machine from the work before the screw threads are damaged. Various means have been proposed for locking out the cam clutch in disengaged condition to prevent impacting. Usually the locking devices are only partly effective and permit the teeth of the cam clutch to rub over their crests with a ratcheting action, because the axial disengaging movement of the clutch does not exceed the altitude of the clutch teeth. The ratcheting action causes excessive wear of clutch teeth and, as in the case of impacting, causes the screws to be tightened beyond the degree at which the clutch is set to disengage.

In a prior application, Serial No. 310,298, filed September 18, 1952, now Patent 2,765,059 granted October 2, 1956, it was proposed to combine a manually controlled jaw clutch with two automatic clutches, one of which operates with a cam action to lift the other, and with a latching device to hold the driving element of the other clutch in raised position. In that arrangement the driven element of the other clutch dropped completely out of the range of its associated driving element upon interruption of the driving connection and the driving element remained locked in its raised position until released by a recycling operation incident to the release of the manual jaw clutch.

An object of this invention is the provision of a clutch device which will automatically release upon development of a predetermined torque without repeated re-engagement and without requiring a third clutch in addition to the cam clutch and manually operated jaw clutch.

Another object is to release a jaw clutch in response to a predetermined load by automatically moving the clutch elements apart a distance greater than the altitude of the jaws.

A further object is to combine in a single pair of clutch elements the functions of both an automatic and a manually controlled clutch. A feature of one embodiment of this invention resides in a jaw clutch in which the driven element has three different positions. A feature of another embodiment of this invention resides in a jaw clutch having a driving element movable to two positions under automatic control and a driven element movable to two positions under manual control.

A still further object is the provision of a cam clutch which is reliable in operation and will last for long periods with minimum wear.

Still another object is to obviate the need for a ball retainer in a clutch of the ball and pocket type.

Another object to provide a clutch operable in either direction of rotation with the disengaging torque somewhat higher for one direction of rotation than for the other without any change in adjustment.

Another feature of this invention is a latching device for connecting one of the elements of the automatic clutch with one of the elements of the manual jaw clutch, whereby the axial movement of the former is effective to move the latter axially out of mesh with its associated jaw member.

Yet another object is to delay the declutching movement of the jaw clutch until after the automatic cam clutch has completed its separating movement, and to cause the jaw clutch to separate at the same time that the cam clutch returns to mesh.

A further object is to lock the elements of the jaw clutch in separated condition until the operator recycles the machine by lowering the driven element.

Other objects and features of the invention will appear from the description which follows.

In the accompanying drawings FIGS. 1–7, 8a–8d, 9a–9d, 10a–10d, and 11–23 show a machine embodying one form of invention; FIGS. 24–27 show a modified cam clutch; and FIGS. 28a–28d show a modified machine. More particularly:

FIG. 1 is a view, in longitudinal section, of a threaded fastener setting machine, showing the clutch parts in initial driving condition with the manual clutch engaged by pressure of the tool head upwardly of the housing, the section being taken through radial planes as indicated by the arrows 1 in FIG. 2;

FIGS. 2, 3, 4 and 5 are cross-sectional views as indicated by the arrows 2, 3, 4 and 5 respectively in FIG. 1;

FIG. 6 is a longitudinal section of the upper end of the driven shaft head, showing the slot for receiving a key;

FIG. 7 is a view similar to FIG. 6 but taken through a different radial plane;

FIG. 8a is a half longitudinal section of the machine shown in FIG. 1, but in idle condition, and with the tool head extended and the jaw clutch disengaged;

FIG. 8b is a view similar to FIG. 8a with the tool head positioned upward of the casing, and engaged with the driven fastener (not shown) to engage the jaw clutch and cause the driven shaft and tool head to be driven but under relatively light load;

FIG. 8c is a view similar to FIG. 8b but with the elements of the cam clutch separated in response to a predetermined disengaging load, the key being omitted;

FIG. 8d is a view similar to FIG. 8c showing the driving element dropped to its original position but with the driven element of the jaw clutch pushed down to disengaged position;

FIGS. 9a–9d are views corresponding with FIGS. 8a–8d respectively, but on a larger scale and showing only a few of the clutch parts including the driving element of the cam clutch and the associated latching means;

FIG. 10a is a fragmentary development, on the same scale as FIG. 9a, showing the elements of the cam clutch and manual clutch in the initial position as in FIGS. 8a and 9a;

FIG. 10b is a view similar to FIG. 10a but showing the clutch elements in the driving position, corresponding to FIGS. 8b and 9b;

FIG. 10c is a view similar to FIG. 10a but showing the clutch elements in the disengaging position, corresponding to FIGS. 8c and 9c;

FIG. 10d is a view similar to FIG. 10a but showing the clutch elements in the final non-driving condition corresponding to FIGS. 8d and 9d;

FIG. 11 is a cross-section looking upward as indicated by the arrows 11 in FIG. 1 and showing the driving element of the cam clutch;

FIG. 12 is a cross-section looking downward as indicated by the arrows 12 in FIG. 1 and showing the driven element of the cam clutch;

FIG. 13 is a cross-section in a plane intermediate those of FIGS. 11 and 12;

FIG. 14 is a perspective view on an enlarged scale of the key which transmits axial thrust from the quill shaft to the lower clutch plate, FIG. 15 is a plan view of the drive shaft;

FIG. 16 is a longitudinal section of the drive shaft;

FIG. 17 is a cross-section of the drive shaft as indicated by the arrows 17 in FIG. 16;

FIG. 18 is a cross-section through the quill shaft as indicated by the arrows 18 in FIG. 19;

FIG. 19 is a longitudinal section of the quill shaft;

FIG. 20 is a cross-section of the quill shaft as indicated by the arrows 20 in FIG. 19;

FIG. 21 is an elevational view of the lock-out sleeve;

FIG. 22 is a longitudinal section of the lock-out sleeve as indicated by the arrows 22 in FIG. 21;

FIG. 23 is an elevational view of the lock-out plunger;

FIG. 24 is a bottom plan view of a modified upper clutch plate;

FIG. 25 is a longitudinal section of the modified upper clutch plate as indicated by the arrows 25 in FIG. 24;

FIG. 26 is a plan view of the intermediate clutch plate which forms the driven element of the modified cam clutch;

FIG. 27 is a longitudinal section of the modified intermediate clutch plate as indicated by the arrows 27 in FIG. 26;

FIG. 28a is a half longitudinal section of a modified machine with the parts in idle condition in which the tool head is extended and the toothed clutch is disengaged;

FIG. 28b is a similar view of the modified machine, but with the tool head positioned upward of the casing and engaged with the driven fastener (not shown) to engage the toothed clutch and cause the driven shaft and tool head to be driven under relative light load;

FIG. 28c is a view similar to FIG. 28b, but with the elements of the cam clutch separated in response to a predetermined disengaging load; and FIG. 28d is a view similar to FIG. 28c showing the driven element of the cam clutch restored to its original upward position in which it has pulled the driving element of the toothed clutch upwardly into disengaged position.

Referring to FIG. 1, the illustrative clutch device is enclosed within a housing 30 having a threaded connection at its end with the gear case 31 of a portable tool preferably powered by a pneumatic or electric motor operating through speed reducing gears, not shown. The parts of the tool which are not illustrated may be conventional, but preferably they would include a flywheel on the motor shaft, also a transmission for driving the spindle 32 at a relatively high speed, inasmuch as the present embodiment of invention may take advantage of high speed and high inertia without having the usual accompanying disadvantages. The tool spindle 32 is supported for rotation in a sleeve 33 carried by a ball bearing 34, but is prevented from axial movement relative to gear case 31 and clutch housing 30. The lower end of the spindle 32 has a splined connection 35 with a tubular drive shaft 36 whose upper extremity rests against a collar 37 seated in a recess 38 in the lower extremity of the sleeve.

Below the splined portion 35, the drive shaft 36 (FIG. 16) has an elongated bore 41, the lower part of which receives, with a rotating fit, a quill shaft 42 (FIG. 19). Intermediate its ends, the quill shaft has a collar 43 normally seated against the lower extremity of the drive shaft 36. Below the collar 43, the quill shaft fits into a bore 44 formed in a tubular driven shaft 45 (FIGS. 6 and 7). At its upper extremity, the driven shaft has end to end engagement at times with the drive shaft 36 and has a counter bore 46 in which the collar may move up and down independently of the driven shaft 45. The latter extends below the bottom end of the housing 30 to form a tool head 47. The tool head has a rotating and sliding fit with the bore 48 in the nose 49 of the housing and also with a similar bore formed in a cap 51 which is threaded on the lower end of the nose. The tool head may be provided with any suitable means for driving a nut, bolt or screw (not shown). In the form illustrated in FIG. 1, the tool head has a ball detent 52 adapted for engagement with a screw driver bit or the like (not shown) and has a split sleeve 53 serving as a retainer for the ball.

In order to transmit the continuous rotation of the drive shaft 36 into controlled and automatically interrupted rotation of the driven shaft 45, there is provided a clutch device including an upper or driving plate 54, an intermediate clutch plate 55 and a lower or driven clutch plate 56. The intermediate plate 55 is supported on the drive shaft 36 for relative rotative (but not axial) movement. For this purpose, the drive shaft is provided with a peripheral groove 57 forming an inner raceway for a row of balls 58, which run in an outer raceway 59 in the intermediate plate 55, forming a ball thrust bearing against which the intermediate plate is seated under spring pressure exerted downward upon the intermediate plate, as will be described later. The upper or driving clutch plate 54 is mounted directly on the drive shaft 36 for relative axial, but not rotative movement. For this purpose, the upper plate is provided with an upward extension 61, a central bore 62 (FIGS. 1, 3, 4 and 11) and a plurality of vertical grooves 63 interrupting the cylindrical surface of the bore. Each groove is of arcuate shape to cooperate with a series of balls 64 which ride in a similar groove 65 in the drive shaft 36, thus providing a splined driving connection between the shaft and the upper plate. The driving plate extension 61 is surrounded by a helical compression spring 66 whose lower end seats against the main part of the upper clutch plate 54 and whose upper end seats against an adjusting collar 67. The collar has a screw connection 68 with the shaft 36 whereby the collar on being turned may regulate the compressive force of the spring 66. In order to lock the collar in adjusted position on shaft 36, the collar is provided with a radial bore 69 for receiving a plug 71 made of a resilient plastic material, for example a synthetic linear polyamide commercially known as "nylon." The outer portion of the radial bore is threaded to receive a set screw 72 adapted to force the nylon plug into tight locking engagement with the screw threads 68 in a manner well-known in the art.

BALL CAM CLUTCH

The drive (upper) clutch plate 54 cooperates with the intermediate clutch plate 55 to form a ball cam clutch. For this purpose, the lower face of the driving plate is provided with a plurality of (for example six), pockets or dimples 73, each having the shape of a zone of a sphere whose center lies below the bottom face of the plate 54. Each pocket fits the upper zone on an associated ball 74. In a similar manner, the upper face of the intermediate plate 55 is provided with the same number of pockets 75, each of sperical shape, with the center of sphere lying above the top face of the plate 55. Each pocket 75 fits the lower zone on the ball 74. In order to space the balls uniformly from each other and to permit them to revolve in unison about the drive shaft 36, without radial displacement, a ball retainer 76 is provided. As shown in FIGS. 1 and 13, the retainer is generally in the form of a disc having six holes 77 each arranged to surround and guide the middle zone of an associated ball 74. The retainer also has a hub portion bored to receive the drive shaft 36 and extending into a center bore 78 (FIG. 11) in the driving plate 54. The balls 74 are normally retained in their respective pockets or dimples 73 and 75, without the aid of the retainer 76 by the pressure of the compression spring 66 which transmits its upward reactive force through collar 67 to the drive shaft 36 and its downward operating force through clutch driving plate 54, balls 74, intermediate plate 55 and ball thrust bearing 59, 58, 57 back to the drive shaft.

When the machine is operating under moderate load, the driving and intermediate plates 54 and 55 rotate together with the drive shaft 36 without any relative axial or relative rotating movement. All of such torque is transmitted from driving pockets 73 through the balls 74 to the driven pocket 75. Due to the spherical shape of the interengaging surfaces, the ball and pocket clutch acts as a cam to resolve the driving force into two components, one rotary and the other axial. The latter has a tendency to raise the driving plate, 54, which tendency, however, is resisted by the pressure of spring 66. Upon increase in the resistance of the intermediate plate 55 to rotation, the torque transmitted through the ball cam clutch increases and the axial component increases correspondingly until it overcomes the opposing force of spring 66. Thereupon, the driving plate 54 is displaced upwardly as the balls 74 roll out of their pockets 73 and 75. Driving plate 54, being released from engagement with the intermediate plate, continues to rotate ahead of the latter, with the balls 74 rolling over the flat surfaces on the top face of the intermediate plate 55 and on the lower face of the driving plate 54. At the end of one hundred twenty degrees (120°) of relative rotation between plates 54 and 55, or sixty degrees (60°) of revolution of the balls 74 relative to either plate, each ball becomes aligned with an advanced pocket 75 on the intermediate plate and a trailing pocket 73 on the drive plate, being guided in the proper path and in properly spaced relation by the retainer 76. When the balls are thus realigned with a new set of pockets, the compression spring 66 quickly moves the driving plate 54 down, thus re-engaging the ball and pocket cam clutch.

If the load on the intermediate clutch plate 55 were continued, the ball cam clutch would again disengage and re-engage to produce a series of torsional impulses driving the intermediate plate and the work driven thereby at an instantaneous torque greater than the predetermined value at which the clutch released. In order to avoid such a series of re-engagements under torsional impulses, the present invention provides an arrangement responsive to the disengagement of the ball cam clutch, that is the upward movement of driving plate 54, to relieve the intermediate plate 55 from load. With such an arrangement, which includes a secondary clutch and which will be described later, the ball cam clutch re-engages under a no-load condition and does not either drive the tool head or return to its normal condition until the operator intervenes to recycle the machine.

SECONDARY CLUTCH—MANUAL CONTROL

Referring to FIGS. 8a and 10a the secondary clutch comprises interengaging jaws or teeth 79 and 81 formed on the bottom of the intermediate clutch plate 55 and the top of the driven clutch plate 56 respectively. For holding the secondary clutch in engagement, the driven plate 56 is arranged to rest on a coiled compression spring 82, the lower end of which seats on a plate 83. The latter is immovable at all times with respect to the driven shaft 45, being supported on a split washer 84 protruding from an annular groove in the driven shaft. The driven clutch plate 56 is arranged to be withdrawn from clutch engagement from the intermediate plate 55 either along with spring 82 by manually controlled means, or in opposition to the spring by automatically operating means. The manual means, which will be described first, comprises a shoulder 85 (FIGS. 1, 5 and 8c) on the driven plate 56 which provides a seat at all times for an outwardly projecting lug 86 (FIGS. 1, 8b and 14) on a driving key 87. The key is mounted in a slot 88 (FIGS. 6 and 7) in the driven shaft 45 and is slidably mounted in a groove or slot 89 in a lower extension of driven plate 56 and thus provides a driving connection between the clutch driven plate and the driven shaft 45. Key 87 has an inwardly projecting lug 91 (FIGS. 8b and 14) which is seated at times against the bottom side of the collar 43 on the quill shaft 42. The inward projection 91 fits into a recess 92 (FIGS. 19 and 20) in the quill shaft. Upward movement of the key relative to the driven shaft 45 is limited by a split retaining ring 93 (FIG. 8b) mounted in an annular groove 94 (FIG. 7) in the driven shaft.

From the foregoing description, it will be seen that the driven clutch plate 56 can be forcibly withdrawn from driving engagement with the intermediate plate 55 upon downward movement of the quill shaft 42 in the driving shaft 36, such downward thrust being transmitted through the quill collar 43 and key projections 91 and 86. The means for effecting such downward movement of the quill shaft 42 automatically will now be described. Referring particularly to FIGS. 1 and 8d, it comprises a disengaging spring 95 exerting downward pressure on a stop ring 96 seated on a thrust collar 97 which is enclosed in the driven shaft 55 and is secured thereto by a radial pin 98. The stop ring 96 and disengaging spring 95 are located in the main counterbore 99 (FIG. 19) in the quill shaft 42. The disengaging spring 95 seats at its upper end against an annular shoulder 101 (FIG. 23) on a lock-out plunger 102. The lock-out plunger is surrounded by the spring 95 within the counterbore 99 and has a sliding fit at its upper end with a bore 103 (FIG. 19) in the quill shaft 42, and at its lower end with a bore in the stop ring 96. Within the upper part of counterbore 99, and surrounding the plunger 102, is an upper disengaging spring 104 interposed between the plunger shoulder 101 and the upper end of the counterbore 99. The upper and lower disengaging springs are under compression and tend to move the driven shaft 45 downward at all times with respect to the drive shaft 36 and casing 30. Such downward movement carries with it the split washer 84, permitting the spring plate 83 to move downward and relieving the compression spring 82 of compressive force. At the same time, the downward movement of the driven shaft 47 is imparted through the split retaining ring 93, key projecton 86 and clutch plate shoulder 85 to withdraw the driven clutch jaws 81 below the path of the driving jaws 79, as shown in FIG. 8a. In order to engage the secondary clutch 55, 79, 81, 56, the operator presses down on casing 30 until the reaction of the work against the tool head 47 forces the tool head and driven shaft 45 upwardly with relation to the drive shaft 36. Such upward movement occurs against the pressure of the upper and lower disengaging springs 95 and 104 as above described.

SECONDARY CLUTCH—AUTOMATIC CONTROL

It has been pointed out that the operator may disengage the secondary clutch 55, 56 by relieving the downward pressure of the machine against the work, thus permitting the disengaging springs 95 and 104 to move the driven shaft 47 downward, the driven shaft acting through the spring plate 83 to relieve the pressure of the engaging spring 82 and at the same time imparting a thrust through the key 87 to withdraw the driven clutch plate. In accordance with this invention, there is also an automatic means which acts through key 87 to withdraw the driven clutch plate 56 from engaging position without any accompanying downward movement of the driven shaft 45, and operating against pressure of the engaging spring 82. The automatic control means operates by pushing the quill shaft 42 down relative to the driving and driven shafts 36 and 45 respectively, and by holding the quill shaft down until the operator intervenes by recycling the machine. The automatic means is responsive to the rise and fall of the driving clutch plate 54 which occurs at the time that the ball clutch disengages in response to a predetermined load. Referring to FIGS. 1, 8d and 9a, the automatic control means comprises a dish-shaped washer 105 resting atop the extension 61 on the clutch driving plate 54. The upper face of the washer 105 supports a transverse pin 106 which extends through radial slots 107 (FIGS. 1, 2, 16, 17) in the drive shaft 36. The transverse pin fits a diametrical bore 108 (FIGS. 21 and 22) in a lock-out sleeve 109 which has a sliding fit within the elongated bore 41 of the drive shaft 36. At the upper end of said bore is a compression spring 111 interposed between the spindle 32 and the lock-out sleeve 109 to hold the pin normally adjacent the bottom of the radial slot 107, and at all times in seated relation with respect to the washer 105 and driving clutch plate 54, 61.

The inner wall of the sleeve 109 fits over a reduced extension 112 (FIGS. 9a and 19) on the quill shaft 42 and is adapted at times to cover a series of three radial holes 113 (FIG. 18) in the extension. A ball 114 (FIG. 4) is arranged in each of the radial holes, and is prevented from projecting outward therefrom when the lockout sleeve 109 is in its lowered position, as shown in FIG. 9a, but is permitted to project out when the sleeve is raised, as shown in FIGS. 9c and 9d. The bottom edge of the sleeve has a chamfer 115 (FIG. 22) arranged to move the balls 114 inward when the sleeve is dropped from the FIG. 9d to the FIG. 9a position. The lock-out plunger 102 at its upper end has a cylindrical extension 116 (FIG. 23) of reduced diameter to permit it to pass the balls 114 without interference. At the base of the extension 116 is an upwardly tapering or camming portion 117 adapted, upon raising of the plunger, to engage the balls 114 with a force tending to move them radically outward. When the lock-out sleeve 109 is in its lowered position, as shown in FIG. 9b, the balls rest at the narrow end of the taper 117 and act as a positive lock to prevent the lock-out plunger 102 from rising. When the lock-out sleeve 109 is in its raised position, as shown in FIG. 9c, the balls 114 are permitted to move outward and thus release the lock-out plunger for upward movement as the balls ride over the tapering portion 117. In its raised position (FIG. 9c) the lock-out plunger 102 holds the balls 114 in outwardly projected position and the balls, in turn, have a locking effect on the chamfered edge 115 to prevent the lock-out sleeve 109 from dropping without carrying with it the quill shaft 42.

Upward movement of the lock-out sleeve 109 relative to the quill shaft 102 is limited by a ball 118 (FIGS. 3 and 8c) rolling in an annular groove 119 (FIG. 19) in the quill shaft and extending into a vertical slot 120 in the lock-out sleeve. This arrangement prevents the clutch device from falling apart while being adjusted.

OPERATION—(FIGS. 1–23)

In the first or initial stage of operation, the parts of the machine are in the position illustrated in FIGS. 8a, 9a, 10a, with the driven shaft 45 held down by the disengaging springs 95, 104 and with the tool head 47 projecting below the casing 30, and with the clutch driven plate 56 held down in disengaged position by the action of the driven shaft 45 through split ring 93 and key 87. Rotation of the driving spindle 32 (FIG. 1) is now imparted to the drive shaft 36, balls 64, clutch driving plate 54, and through the ball cam clutch 73, 74, 75 to the intermediate clutch plate 55, all of which parts rotate in unison and under no-load condition.

The operator then presses down on the casing 30 to move the tool head 47 into engagement with the work piece (not shown) to be driven, and the reaction of the work moves the tool head up relative to the casing 30 and drive shaft 36 supported therein. The driven shaft 45, of course, moves up with the tool head and carries with it the spring plate 83, spring 82, driven clutch plate 56, and key 87. Upward movement of the driven shaft 45, also imparts further compression to the disengaging springs 95 and 104, and starts the lock-out plunger 102 on its upward movement.

DRIVING

In the second or driving stage of operation, the parts are in the positions shown in FIGS. 1, 8b, 9b, and 10b, in which there is full engagement of the secondary clutch 55, 79, 81, 56 as well as of the ball cam clutch 54, 73, 74, 75, 55. At this stage, the lock-out plunger 102 is urged upward by the lower disengaging spring 95 but is held in an intermediate position by the engagement of its shoulder 117 with the locking balls 114 as shown in FIG. 9b. Intermediate clutch plate 55 is driven as in the initial stage but is now under load due to the torque reaction of the driven work piece transmitted back through tool head 47, driven shaft 45, key 87, driven plate 56 and the jaws 81 and 79 of the secondary clutch which is now engaged. Such torque reaction is transmitted back through the ball cam clutch 75, 74, 73, where it exerts a camming component of force tending to separate the driving and intermediate clutch plates 54 and 55. The camming component which tends to raise the plate 54, is proportional to the torque delivered by the tool head 47. As long as the torque reaction is moderate, this tendency is effectively resisted by the compression spring 66 which is under precompression in order to hold the parts of the ball and pocket clutch against any relative movement. The force of this spring is regulated by turning the adjusting nut 67 in a manner well-known in the art.

SEPARATED

When the driven nut, screw or bolt is tightened to the desired degree, the torque reaction rises to the predetermined amount and becomes sufficient to overcome the holding force of compression spring 66. As the heavy spring 66 yields, the upper clutch plate 54 rises to the position shown in FIGS. 8c, 9c and 10c (full lines) and carries with it the washer 105, pin 106 and lock-out sleeve 109. The sleeve is then removed from the path of the balls 114 to permit them to move radially outward of the bores 113 in the quill shaft 42. The balls are so moved by the camming action of the tapered shoulder 117 on the locking plunger 102, the latter being raised from its intermediate (FIG. 9b) position to its upper (FIG. 9c) position in response to spring pressure as previously described. In this position, the balls 114 are interposed in the path of the chamfer 115 on sleeve 109 and lock the sleeve in its raised position as long as the balls are prevented from moving radially inward due to their engagement with the cylindrical body portion of plunger 102.

The rising movement of the upper clutch plate 54 is accompanied, of course, by relative rotary movement of the driving plate 54 ahead of balls 74, and of the balls ahead of the intermediate plate 55, which is the driven element of the cam clutch. The plate 54 is lifted its maximum amount, and the driving and driven elements of the pocket cam clutch are fully separated when the balls have left the pockets and rest between the adjacent plane surfaces on plates 54, 55. The amount of such separating movement should be greater than the altitude of the jaw 79 or 81. The balls continue to roll over plane surfaces on plates 54, 55, being confined to their orbit by the ball retainer 76. The elements 54, 55 of the pocket cam clutch remain in fully separated condition for almost 120° of relative rotation of driving element 54 ahead of driven element 55, whereupon each ball reaches the next advanced driven pocket 75 and is overtaken by the succeeding driving pocket 73. Just before the balls and pockets re-register, the parts are in the position shown in broken lines in FIG. 10c. There, it will be noted, the ball 74 (broken lines) has just rolled over the trailing edge of pocket 75 (full lines) and has started down the side of the pocket. Since the balls are pressed downward under the action of the heavy spring 66, they have a camming action on the trailing end of the arc or pocket 75 which tends to turn the driven cam element 55 in the direction opposite to the direction of drive of upper plate 54 (indicated by the arrows in FIGS. 10a–10d). The effect of the instantaneous camming or snap action is to withdraw the driving jaw 79 (broken line position shown in FIG. 10c) out of driving engagement with the driven jaw 81 of the secondary clutch. Teeth 79 and 81, being released from frictional engagement, are now in condition to be separated axially with minimum effort.

As the upper clutch plate 54 descends from the FIG. 9c to the FIG. 9d position, it releases for downward movement the lock-out sleeve 109 and its associated supporting pin 106 as well as the dish shaped washer 105 which seats at all times atop the driving plate extension 61 under the action of compression spring 111. In its downward movement, the lock-out sleeve 109 is latched to the quill shaft 42 due to the action of chamfer 115 on balls 114 and, therefore, carries the quill shaft downward. The quill shaft 42 in its descent operates through its collar 43 (FIG. 8d) and key 87 to force the driven plate 56 downward, with spring 11 overpowering spring 82, to break the driving connections 79, 81. Disengaging movement of lower clutch plate 56 takes place at the same time as re-engaging movement of intermediate plate 55, but contact is broken between the jaws 79, 81 shortly prior to the time that the ball and pocket cam 73, 74, and 75 is completely re-engaged. With this arrangement, the re-meshing of the ball and pocket cam occurs under conditions of "no load" and torsional shocks are prevented. In the final position of the parts shown in FIGS. 8d and 10d, the jaws 79, 81 of the secondary clutch are locked out of engagement and the elements 54, 55 of the pocket cam clutch rotate in unison but without any effect upon the tool head 47. There is sufficient clearance between the jaws 79 and 81 in the final position so that there is no danger of the jaws rubbing together, even if the latching devices 102, 114, 119, 42, 47 should operate with a slight amount of lost motion. To insure adequate clearance of the jaws, the depth of the pocket 75 should be more than one-half the height of the jaws 79 or 81.

RECYCLING

In order to condition the machine for a new nut running or screw driving operation, the operator withdraws the machine from the work, thereby releasing the tool head 47 for downward motion relative to casing 30 under the influence of springs 104, 95. As these springs expand, they cause the lock-out plunger 102 to move downward until the tapered shoulder 117 clears the balls 114 to permit them to move radially inward, whereupon the chamfer 115 on lock-out sleeve 109 cams the balls 114 out of locking engagement with the sleeve. Quill shaft 42 is now released and moves up to the position shown in FIGS. 8a and 9a. Upward movement of the shaft 42 is caused by the compression springs 95, 104 which react downwardly against the stop ring 96, driven collar 97, radial pin 98, driven shaft 45 and split washer 84 to the casing 30. The parts are then in the FIG. 8a position in condition to start a new cycle, as previously described.

REVERSE

Should the operator, after having driven a threaded fastener (nut, bolt or screw, not shown) to the desired degree of tightness, desire to loosen the fastener, he resets a valve, switch or gear shift (not shown) to drive the spindle 32 in the reverse direction and starts a new cycle by pressing the machine against the work. Except for one detail, the parts of the illustrative clutch device are symmetrical and operate the same for left hand as for right hand rotation. The difference in detail resides in a rounded corner 122 (FIG. 10a) formed on the trailing end of each driving pocket 73 and the leading end of each driven pocket 75. During the tightening cycle of operation, in the direction indicated by the arrows in FIGS. 10a–10d, the rounded corners 122 facilitate separation of the pocket cam clutch. In the case of reverse or left hand rotation, however, the remaining corners which are sharp become the trailing ends of the driving pockets 73 and the leading ends of the driven pockets 75. In that relation, the sharp corners do not permit the driving pockets 73 to ride over the balls 74 or the latter to ride over the driven pockets 75 except at a torque somewhat higher than would be sufficient if the corners were rounded. With this arrangement, any screw that is driven to the selected tightness can be readily backed out with the same adjustment of the machine, and without automatic disengagement. In the foregoing description, it was assumed that the fastener has right hand threads and may be tightened until the clutch device automatically releases, and may be loosened without any automatic declutching action. If, however, the tool is used for tightening fasteners having left hand threads, the clutch will automatically release when the fastener attains a predetermined tightness. In that case, however, the pockets 73 and 75 should be modified by transposing the rounded corners 122.

DIGEST

The cycle of operation of the device shown in FIGS. 1–23 may be represented briefly by the following tabulation:

| Stage | Plate 54 | Quill Shaft 42 | Plate 56 | Driven Shaft 45 | Shown in Figs.— |
|---|---|---|---|---|---|
| #1—initial | down | up | down | down | 8a, 9a, 10a |
| between stages | down | up | rising [1] | rising [1] | |
| #2—driving | down | up | up | up | 1, 8b, 9b, 10b |
| between stages | rising | up | up | up | |
| #3—separated | up | up | up | up | 8c, 9c, 10c |
| between stages | falling | falling | falling | up | |
| #4—final | down | down | down | up | 8d, 9d, 10d |
| between stages 4 and 1. | down | rising | down | falling [1] | |

[1] Moved by operator—otherwise automatically.

It is assumed that the vertical position of casing 30 and drive shaft 36 do not change; also, that shaft 36 and upper clutch plate 54 are rotating in unison at all times.

It will be seen that at the moment of clutch separation (stage #3) the driving plate 54 of the cam clutch, the quill shaft 42, and the driven plate 56 of the secondary clutch are all in their raised positions; that these three elements then descend as a unit and remain in their lowered positions throughout the final stage (#4) and until the latching device is released by the intervention of the operator, whereupon the quill shaft rises independently.

MODIFIED POCKET CAM—FIGS. 24–27

FIGURES 25 and 27 show, in properly spaced relation, a modified assembly of driving plate 124 and intermediate plate 125 which may be used to replace the plates 54 and 55 respectively. Driving plate 124 has pockets or dimples 126 similar in shape and function to the pockets 73, except that the pockets 126 are connected by an annular groove 127 arcuate in cross-section. The spherical pockets 126 and toroidal groove 127 have the same radius of curvature as the balls 74 but the centers of such radii are so spaced that the groove is of less depth than the pockets. The intermediate plate 125 has a set of driven pockets 128 and annular connecting groove 129 complementary to the driving pockets 126 and 127 respectively. With this modified arrangement, the balls 74, on being dislodged from the pockets, move in the pair of raceways 127 and 129 from one pocket to the next. As a result, the retainer 76 is omitted and the structure simplified. The amount of separation of plates 124 and 125 in an axial direction is equal to the difference between the depth of groove 127 and the depth of pocket 126, multiplied by two. This amount should exceed the altitude of the jaws 79 or 81 of the secondary or manual clutch.

Another advantage of the modified pocket cam is that the annular groove 127 provides a greater area of contact with the ball than does a flat surface and therefore minimizes wear.

If desired the modified cam clutch may be provided with a rounded corner or chamfer 127a (or 129a) connecting each of the pockets 126 (or 128) with the annular groove 127 (or 129), to become effective in one direction of rotation, for the same purpose as the rounded corners 122 of FIG. 10a.

MODIFIED MACHINE (FIGS. 28a–28d)

The modified machine illustrated in FIGS. 28a to 28d operates on substantially the same principle as the device of the preceding figures but has the advantage of simplicity of construction with a resulting saving in manufacturing cost and reduction in size. The modified clutch device is enclosed within a housing 130 similar to, but considerably shorter than, the housing 30. Housing 130 has a threaded connection at its upper end with a gear case 131. Mounted within the gear casing is a ball bearing 132 for supporting a rotatable spindle 133. Keyed to the spindle and resting against the inner race of ball bearing 132 is a driving cup 134. The lower face of the cup is recessed to receive a roller thrust bearing 135. An annular flange 136 on the cup extends below the recessed portion and surrounds, with a rotating fit, a clutch plate 137. Below the flange 136 the cup has a plurality of fingers 138 slidably fitting the grooved sides of a lower clutch plate 139. The connection between the fingers 138 and plate 139 is such as to impart to the latter the torque of the driving cup 134 while permitting the plate 139 to move up and down. Plates 137 and 138 form respectively the driven and driving elements of a pocket cam clutch. For this purpose, each of the plates is formed on its adjacent face with a series of spherical pockets or dimples 140 connected by an arcuate annular groove 141 similar in shape, arrangement and function to the pockets 126 and groove 127 respectively in the device of FIGS. 24 and 25. A series of balls 142 is received between the elements of the pocket cam clutch. This clutch is normally maintained in fully meshed condition by a heavy compression spring 143 which lies below the driving plate 139 and which rests upon an inturned flange 144 at the bottom of a spring retainer sleeve 145. The upper part of the sleeve 145 has a screw threaded connection 146 with the driving cup 134 which permits the flange 144 to be raised and lowered, thereby changing the degree of precompression of spring 143. In order to lock the sleeve 145 in its selected position of adjustment, a split ring 147 is arranged in embraced relation to the sleeve and has an inturned flange at one end adapted to project through a slot in the sleeve and a groove 148 in the driving cup 134.

Extending axially through the pocket cam clutch is a quill shaft 151 which has a splined connection 152 with the driven clutch plate 137. The splined connection permits the quill shaft 151 to move up and down while the plate 137 remains always in the same vertical position, being held against the thrust bearing 135 by the pressure of spring 143. Downward movement of the quill shaft is limited by a split ring 153 embracing an annular groove in the quill shaft and resting on the upper surface of the clutch plate 137. Below the spined connection 152, the quill shaft 151 has a cylindrical portion 154 which is received within the driving plate 139 with a rotating and sliding fit. Below the cylindrical portion 154, the quill shaft has a splined portion 155 which fits a complementary splined portion of the upper plate 156 of a secondary clutch. Plate 156 has driving jaws or teeth 157 engageable at times with similar jaws 158 on lower clutch plate 159 which forms the driven element of the secondary clutch. Quill shaft 151 is adapted at times to lift the driving plate 156 to disengage the secondary clutch. For this purpose, a split ring 161 is arranged to embrace an annular groove in the quill shaft and to provide a seat for the clutch driving plate 156 so that the latter always partakes of the up and down movement of the quill shaft. Plate 156 is held in its seated relation by a compression spring 162 interposed between plate 156 and plate 139.

A driven shaft 163 telescopes within the lower end of the quill shaft 151 with a rotating and sliding fit and provides a bearing for the quill shaft. The lower end of the driven shaft 163 projects beyond the housing 130 to form a tool head 164. The tool head has a ball detent 165 adapted for engagement with a screw driver bit or the like (not shown). The tool head has a rotating and sliding fit with a bore in the nose 166 on the housing 130, and it carries a cylindrical sleeve 167 which has a rotating and sliding fit with a bore in the housing 130. Sleeve 167 rests on an annular shoulder 168 on the tool head and provides a seat for the driven plate 159 of the secondary clutch. Plate 159 is affixed to the tool head 164 or driven shaft 163, being held against relative axial or rotative movement by means of the split ring 169 and splined connection 171 respectively.

When the parts of the machine are at rest, the tool head 164 projects below the nose piece 166, being limited by the engagement of the lower clutch plate 159 with the bottom wall of the housing 130. Resilient means is provided for holding the tool head yieldingly in this position and at the same time for reacting upward to hold the driving cup 134 seated against the ball bearing 132. The resilient means comprises an upper disengaging spring 172 and a lower disengaging spring 173, each of which surrounds lock-out plunger 174 positioned coaxially of the housing 130. The upper and lower springs seat respectively upon an upper collar 175 and a lower collar 176 carried by the lock-out plunger. At its upper end, the spring 172 provides a seat for an inner cup 177 which engages a bottom face of the driving cup 134. The upper end of the spring 173 presses against a lock-out sleeve 178 which has a bore slidably fitting the lock-out plunger and a counter-bore surrounding the lower end of upper disengaging spring 172. Between the bore and the counter-bore, the lock-out sleeve has a shoulder 179 which seats against the collar 175 when the machine is in the idle position shown in FIG. 28a. At its top, the lock-out sleeve 178 has a conical surface or chamfer 181 engageable with a set of lock-out balls 182 (only one shown), each mounted in a radial bore 183 in the quill shaft 151. When the lock-out sleeve 178 (along with plunger 174) is elevated, the chamfer 181 engages the ball with a camming force tending to move it out of the radial bore 183 and beyond the periphery of the quill shaft 151. Such outward movement is normally prevented (with the pocket cam clutch engaged) by contact of the ball 182 with a portion of the clutch driving plate 139 which covers the radial bore 183. The clutch plate 139 has a recess 184 which permits such outward radial movement at times when the clutch driving plate 139 is in its lower or disengaged position. The bottom of the recess 184 is chamfered to provide a camming action urging the ball 182 inward when the clutch driving plate 139 is lifted back to its original position. Such radial inward movement is permitted at times when the lock-out sleeve 178 lies below the radial bore 183, as in FIG. 28a; but is prevented at times when the lock-out plunger covers the radial bore, as illustrated in FIGS. 28c and 28d.

OPERATION—FIGS. 28a TO 28d

In the idle condition of the machine, as shown in FIG. 28a, the driving and driven elements 139 and 137 respectively of the pocket cam clutch are fully engaged, being held together by the precompressed spring 143; while the driven element 159 of the secondary clutch is held out of engagement with its associated driving element 156 by the action of the disengaging springs 172, 173. When the operator starts the motor (not shown), the driving spindle 133 rotates and carries in unison therewith the driving cup 134, fingers 138, clutch driving plate 139, balls 142, clutch driven plate 137, quill shaft 151 and the driving plate 156 of the secondary clutch, all of which rotate in unison. The driven element 159 of the secondary clutch and the driven shaft 163 do not rotate at this time.

The operator then engages the machine with the work to press the tool head 164 upward relative to the clutch housing 130 to the position shown in FIG. 28b. The tool head in its upward movement carries with it the driven shaft 163 (integral with the tool head) also the driven element 159 of the secondary clutch which is thereby engaged with the associated driving element 156. The lock-out plunger 174 is carried upward along with driven shaft 163 and the same is true of the spring 173 and the lock-out sleeve 178 until the latter is stopped by engagement with the balls 182, which are prevented from moving outward at this time. Rotation of the driving element 156 of the secondary clutch is now imparted through the engaging jaws 157 and 158, the driven element 159 and tool head 164 to the driven fastener (not shown) and the resistance of the latter to rotation produces a torque reaction which has a tendency to separate the elements of the pocket cam clutch 139, 137. As long as this torque reaction is moderate, however, the camming effect upon the balls 142 and pockets 140 is insufficient to overcome the holding force of the precompressed spring 143, and the parts of the clutch device, therefore, remain in the respective positions shown in FIG. 28b.

When the resistance to rotation attains the predetermined limit, for example, when the head of the driven screw (not shown) becomes seated, the axial or camming component of the force transmitted through the ball and pocket cam clutch becomes sufficient to overcome the spring 143 and more the driving plate 139 thereof down to the position shown in FIG. 28c. Such axial disengaging movement is accompanied by relative rotative between the driving plate 139 and balls 142, also between the balls and the driven plate 137, with the result that the balls roll along the relatively shallow grooves 141, thus momentarily holding the plates of the pocket cam clutch apart. During this brief instant the recess 184 in the lowered plate 139 uncovers the radial bore 183 to permit the lock-out balls 182 to move radially outward beyond the periphery of the quill shaft 151. The balls upon being released are immediately cammed outward and into the recess 184 by the action of the lock-out sleeve 178 in response to the precompressed spring 173. The lock-out sleeve in its raised position shown in FIG. 28c, covers the inner end of the radial bore 183 and prevents the ball 182 from moving out of the recess 184 in the clutch plate 139, thus locking the plate against upward movement relative to the quill shaft.

After the driving plate 139 has advanced sufficiently to realign the pockets 140 and balls 142 the plate is restored to its upward position by the pressure of spring 143. This restorative movement is accompanied by upward movement of the quill shaft 151 which is now latched to the plate 139 as previously described. In its upward movement, the quill shaft carries with it the driving plate 156 of the secondary clutch pulling the jaws 157 out of engagement with the driven jaws 158. The parts are then in the final position shown in FIG. 28d in which the driving plate 156 of the secondary clutch rotates but does not transmit any power to the tool head 164. The parts remain in the FIG. 28d position until the operator intervenes.

To recycle the machine, the operator pulls the housing 131, 130 away from the work to relieve the upward axial pressure on tool head 164. The tool head is then dropped to the FIG. 28a position by the action of disengaging springs 172 and 173. The lock-out plunger 174 follows the downward movement of the tool head back to the FIG. 28a position, and the collar 175 engages the shoulder 179 on the lock-out sleeve 178 to pull it down and uncover the inner end of bore 183. Up to this time, the quill shaft 151 was urged downward by the spring 162, but the spring pressure was ineffective because the ball 182 had latched the shaft to the plate 139 which was held up by the relatively stronger spring 143. With the uncovering of the bore 183, however, the ball 182 is now permitted to move radially inward.

The quill shaft 151, being unlatched, is moved downward by spring 162 and carries with it the balls 182. In their descent, the balls are cammed inwardly by contact with the bottom of recess 184. The parts are then restored to the original positions shown in FIG. 28a.

From the foregoing description, it will be seen that both forms of invention provide a cam clutch arranged in response to a predetermined load to separate momentarily, in combination with a secondary clutch which disengages upon restoration or re-meshing of the cam clutch. In both forms, a latching device operates upon separation of the cam clutch to tie one element of the latter to one element of the secondary clutch, so that movement of one element into mesh causes movement of another element of another clutch out of mesh. In both forms of invention, the cam clutch is of the ball and pocket type and the secondary clutch is of the type which has spaced interengaging teeth with no requirement for any camming action between the teeth. In the illustrative machine of FIGS. 1–23, the driving element of the cam clutch moves upward on separation, then is latched to the driven element of the secondary clutch, and then moves down to push the secondary driven element out of engagement. In the modified machine of FIGS. 28a–28d, the driving element of the cam clutch moves downward on separation, then is latched to the driving element of the secondary clutch, and then on restoration pulls the driving element of the secondary clutch upward into disengaged position.

In the foregoing description, the terms "upper" and "lower" are used merely as a matter of convenience in describing the relative positions of the parts, and have no geographical significance, as the operation of the clutch is not affected by gravity.

What is claimed is:

1. A clutch device comprising a torque responsive clutch, a secondary clutch in driving relation therewith and adapted to be engaged under manual control, means for automatically disengaging the secondary clutch upon release of said manual control, each clutch having driving and driven elements, the driven element of one clutch being connected to the driving element of the other clutch, means for separating the elements of the torque responsive clutch automatically upon attainment of a predetermined torque without separating the elements of the secondary clutch, and automatic means for simultaneously restoring the torque responsive clutch to engagement and separating the elements of the secondary clutch clear of one another.

2. A clutch device according to claim 1 in which the first separating means is cam operated and the simultaneous means is spring operated.

3. A clutch device according to claim 1 in which the clutches are coaxially rotatable and the secondary clutch is provided with jaws, the depth of engagement of said jaws being less than the relative axial movement of the torque responsive clutch elements in the reengaging direction, whereby the separation of the secondary clutch is completed just prior to the completion of the re-engagement of the torque responsive clutch.

4. A clutch device comprising a torque responsive clutch, a secondary clutch in driving relation therewith and adapted to be engaged under manual control, means continuously acting to disengage the secondary clutch upon release of said manual control, each clutch having driving and driven elements, the driven element of one clutch being connected to the driving element of the other clutch, the elements of the torque responsive clutch being arranged to separate axially upon development of a predetermined torque and to return automatically toward engaged position upon interruption of transmission of torque, holding means for maintaining the elements of the secondary clutch engaged during development of said predetermined torque to enable the torque responsive clutch to complete its separating movement, a latching device responsive to such separating movement to lock one of the elements of the torque responsive clutch at a fixed axial distance from one of the elements of the secondary clutch, and automatic means cooperating with said latching device for simultaneously moving one element of the torque responsive clutch to re-engaged position and one element of the secondary clutch to disengaged position, and the elements of the secondary clutch being symmetrical for rotation in either direction, the driving element of the torque responsive clutch and the driven element of the secondary clutch being adapted respectively for connection with a driving motor and a driven spindle.

5. A clutch device comprising a torque responsive clutch, a secondary clutch in driving relation therewith, each clutch having driving and driven elements, resilient means continuously biasing the elements of the secondary clutch out of engagement and adapted to be overcome upon the application of opposing manual pressure, the driven element of the torque responsive clutch being connected to the driving element of the secondary clutch, the torque responsive clutch having cam means between its elements arranged to cause said last mentioned elements to separate axially upon development of a predetermined torque and to return automatically toward engaged position upon interruption of transmission of torque, holding means for maintaining the elements of the secondary clutch engaged during development of said predetermined torque to permit the torque responsive clutch to complete its axial movement, a latching device operable upon completion of such axial separating movement to lock one of the elements of the torque responsive clutch at a fixed axial distance from one of the elements of the secondary clutch, whereby upon return movement of the last named element is disengaged from its associated element of the secondary clutch, and spring means for effecting such return movement while the latching device is effective.

6. A clutch device comprising a cam clutch, a jaw clutch driven thereby, each clutch having a driving and a driven element, the driven element of the cam clutch being connected to the driving element of the jaw clutch, resilient means tending to hold the jaw clutch apart and adapted to be overcome by manual pressure to engage the jaw clutch, the driving element of said cam clutch being adapted to be disengaged from and thereafter to overrun the driven element thereof, in response to a predetermined load, holding means for maintaining the elements of the jaw clutch engaged during the transmission of said predetermined load to enable the cam clutch to complete its disengagement, and automatic means operably responsive to the release and overrun of the cam clutch for disengaging the jaw clutch independent of said resilient means and during the continued application of manual pressure to the jaw clutch, said automatic means being effective to start the disengagement of the jaw clutch after the cam clutch has completed its disengagement.

7. A clutch device according to claim 6 which is enclosed within a casing and in which the driven element of the jaw clutch is raised by manual pressure into the path of the driving element to engage the jaw clutch, the driving element thereof being raised by said automatic means out of the path of the driven element while the latter continues to be held manually in its raised position.

8. A power operated tool comprising a casing, a torque responsive clutch and a secondary clutch in driving relation with each other and both enclosed within said casing, each clutch having driving and driven elements the driven element of one clutch being connected to the driving element of the other clutch, the torque responsive clutch having cam means between its elements arranged to cause one of said last mentioned elements to move axially relative to the casing and to both of the secondary clutch elements upon development of a predetermined torque holding means for maintaining the elements of the secondary clutch engaged during development of said predetermined torque to enable the torque clutch to complete its separating movement and thereby separate the elements of the torque responsive clutch, and means automatically operative in response to the completion of such separating movement for simultaneously moving the separated element back into engaged relation and moving one of the elements of the secondary clutch into disengaged relation with respect to its associated element.

9. A power operated tool according to claim 8, in which one element of each clutch is held immovable relative to the casing during both the separating and restoring movements aforesaid.

10. A power operated tool according to claim 8, in which the last named means comprises a spring and a latching device connecting the two elements moved thereby.

11. A power operated tool according to claim 10, which includes manually controlled means for simultaneously increasing the separation between the elements of the secondary clutch and for releasing the latching device to recycle the tool.

12. A power operated tool comprising a casing, a torque responsive clutch and a secondary clutch in driving relation with each other and both enclosed within said casing, each clutch having driving and driven elements, the driven element of the torque responsive clutch being connected to the driving element of the secondary clutch, the torque responsive clutch having cam means between its elements arranged to cause one of said last mentioned elements to move axially relative to the casing and to both the secondary clutch elements upon development of a predetermined torque, holding means for maintaining the elements of the secondary clutch engaged during development of said predetermined torque to enable the torque responsive clutch to complete its separating movement, a latching device responsive to such axial separating movement to lock the said one element of the torque responsive clutch at a fixed axial distance with relation to one of the elements of the secondary clutch, automatic means cooperating with said latching device for simultaneously moving said one element of the torque responsive clutch axially to re-engaged position and said one element of the secondary clutch to disengaged position, and means for maintaining the other elements of the two clutches axially immovable with respect to the casing during the axial movements aforesaid.

13. A power operated tool comprising a casing, a torque responsive clutch and a secondary clutch enclosed within said casing, each clutch having driving and driven elements, the torque responsive clutch having cam means between its elements arranged to cause its driving element to move axially relative to the casing to disengaged position upon development of a pre-determined torque, holding means for maintaining the elements of the secondary clutch engaged during development of said predetermined torque to enable the torque responsive clutch to complete its separating movement, a quill shaft surrounded by the driven element of the cam clutch and the driving element of the secondary clutch to impart rotation therebetween, a latching device operable upon disengaging movement of the cam clutch driving element to couple it with the quill shaft, means automatically responsive to completion of such disengaging movement for moving the cam clutch driving element axially in the re-engaging direction along with the quill shaft, and means responsive to such axial movement of the quill shaft to move one element of the secondary clutch out of engaged relation to the other.

14. A reversible power operated screw driver comprising a chuck adapted for the reception of a screw driving implement to drive the latter selectively in a tightening or loosening direction, a torque release clutch and a secondary clutch arranged in series for driving the chuck, said torque release clutch comprising a pair of plates co-axially rotatable, each plate having on its face adjacent to the other a plurality of pockets adapted to move into and out of registry with the pockets in the other plate, balls received in said pockets, resilient means holding the plates together in driving relation with the balls seated in the pockets and while the two plates rotate in unison, said resilient means being yieldable upon development of a predetermined separating force to permit relative axial separation of the plates, said pockets being of approximately spherical shape to transmit torque from one plate to the other in either direction of rotation with an axial separating component of force, the pockets being asymmetrical to set up a greater camming action in the tightening direction of rotation than in the loosening direction, whereby the clutch disengages at a lower torque in said tightening direction than in the loosening direction, said secondary clutch having a driving and a driven plate coaxially rotatable with the plates of the torque release clutch, holding means for maintaining the plates of the secondary clutch engaged during development of said predetermined torque in either direction to enable the plates of the torque release clutch to complete their axial separation, a latching device operable upon completion of the axial separating movement of the torque release clutch to lock one plate of the secondary clutch at a fixed axial distance from one element of the torque release clutch, and spring actuated automatic means cooperating with said latching device for simultaneously moving said one element of the torque release clutch axially into re-engaged position and said one element of the secondary clutch axially into disengaged position.

15. A torque release clutch according to claim 14, in which one end of each pocket has a rounded corner connecting the spherical surface with the face of the plate.

16. A clutch device comprising a cam clutch, a jaw clutch in series driving relation therewith, resilient means tending to hold the jaw clutch apart and adapted to be overcome by manual pressure to engage the jaw clutch, said cam clutch being adapted to be disengaged in response to a predetermined load and to overrun and re-engage, holding means for maintaining the jaw clutch engaged during development of said predetermined load to enable the cam clutch to disengage, and automatic means responsive to the disengagement of the cam clutch for disengaging the jaw clutch, said automatic means starting to become effective after the cam clutch has completed its disengagement and being operable during the continuance of such manual pressure.

17. A clutch device according to claim 16, in which the cam clutch comprises asymmetrical cam surfaces arranged to set up a greater camming action in one direction of rotation than in the other, whereby the automatic means operates at a lower torque in one direction than in the other.

18. A power operated tool for screw driving and the like, comprising a casing, a jaw clutch supported in said casing, said jaw clutch having a driving element and having a driven element below the driving element and co-axially rotatable therewith, each element being movable axially between an upper and lower position with respect to the casing, said elements having jaws adapted to inter-engage only when the driving element is in its lower position and the driven element is in its upper position relative to the casing, said jaws being adapted to disengage upon axial movement of either element relative to the casing in a direction away from the other element, a spring urging the driving element downward, yieldable means urging the driven element downward, manual means for moving the driven element upward relative to the casing in opposition to said yieldable means, and automatic means adapted to overcome said spring to move the driving element upward to disengaged position in response to a predetermined torque.

19. A power operated tool according to claim 18, which includes a latching device for locking the driving element in its raised position relative to the casing, said locking device being arranged to be released upon lowering of the driven element relative to the casing.

20. A clutch device comprising a torque clutch, a jaw clutch driven thereby, each clutch having driving and driven elements, resilient means continuously biasing one element of the secondary clutch out of engagement from the other and adapted to be overcome upon the application of opposing manual pressure, the torque clutch having cam means between its elements arranged to separate the latter axially upon development of a predetermined torque, said cam means permitting the elements of the torque clutch to overrun and reengage automatically in a different relative position upon interruption of transmission of torque, holding means for maintaining the elements of the jaw clutch engaged during development of said predetermined torque to enable the torque clutch to complete its separating movement, the driven element of the torque clutch being affixed to the driving element of the jaw clutch whereby axial separating movement of the torque clutch is accompanied by an increase in the axial distance between the driving element of the torque clutch and both elements of the jaw clutch, a latching device operable upon completion of such axial separating movement to lock the driven element of the jaw clutch at a fixed axial distance from the driving element of the torque clutch, and spring actuated automatic means cooperating with said latching device for simultaneously moving one element of the torque responsive clutch to re-engaged position and one element of the jaw clutch to disengaged position.

21. A clutch device comprising a torque responsive clutch, a secondary clutch in driving relation therewith and adapted to be engaged under manual control, a casing enclosing both clutches, each clutch having an element restrained against axial movement relative to the casing and an element disengageable from the other element by axial movement relative to the casing, the disengageable element of the torque responsive clutch being arranged to separate axially upon development of a predetermined torque and to return automatically to engaged position upon interruption of transmission of torque, and a latching device responsive to such separating movement to lock the disengageable element of the torque responsive clutch in its disengaged position to the disengageable element of the secondary clutch in a predetermined spaced relation to the latter disengageable element for axial movement of both elements as a unit relative to the casing, so that return movement of the disengaged element of the torque responsive clutch to its engaged condition carries the disengageable element of the secondary clutch to a disengaged position.

22. A clutch device comprising a torque responsive clutch, a secondary clutch, the torque responsive clutch having a driving member, the secondary clutch having a driven member, an intermediate clutch member common to both clutches and adapted at times for drivingly connecting the driven member of the secondary clutch with the driving member of the torque responsive clutch, the latter driving member being responsive to a predetermined toque load to overrun the intermediate member and to automatically return axially to re-engage with the latter, means responsive to the overrunning re-engaging action of the driving member to move under the influence of the return axial movement of the driving member the driven member of the secondary clutch clear of the intermediate member, and resilient means tending to separate the driven member from the intermediate member, said resilient means being overcome by the application of manual pressure.

23. A reversible clutch device comprising a torque responsive clutch, a secondary clutch, the torque responsive clutch having a driving member, the secondary clutch having a driven member, an intermediate clutch member common to both clutches and adapted at times for drivingly connecting the driven member of the secondary clutch with the driving member of the torque responsive clutch, spring means constantly urging the driven member axially away from the intermediate member, and manual means for overcoming the spring means for engaging the intermediate and driven members, the driving member being responsive to a predetermined torque load in either direction of rotation while the clutch members are all connected to overrun the intermediate member and to automatically re-engage with the latter, means responsive to said overrunning and consequent re-engaging action in either direction of rotation to separate the driven member of the secondary clutch clear of the intermediate clutch member.

24. In a power operated tool for driving a threaded element, a torque transmitting motor, a spindle adapted for driving engagement with a threaded element, a clutch device operably connecting the motor to the spindle comprising a torque release clutch, a secondary clutch, each having driving and driven elements, the driving element of the release clutch being drivably connected to the motor at all times, the driven element of the secondary clutch being drivingly connected to the spindle at all times, a spring load continuously biasing one element of the release clutch into engagement with the other, the driving element of the release clutch being responsive to a predetermined maximum torque load delivered to the spindle while both clutches are in engagement to overrun the associated driven element against said spring load and to automatically re-engage under the influence of the spring load, means for acting in response to said overrunning and consequent reengaging action to separate the driving and driven elements of the secondary clutch clear of one another, and resilient means constantly exerting a separating force upon the driven element of the secondary clutch relative to the driving element thereof, said resilient means being resisted from such action upon application of manual pressure to the tool to engage the elements of the secondary clutch against the action of said resilient means.

25. In a power operated tool for driving a threaded element, a torque transmitting motor, a spindle adapted for driving engagement with a threaded element, a clutch device operably connecting the motor to the spindle comprising a torque release clutch, a secondary clutch, each having driving and driven elements, the driving element of the release clutch being drivably connected to the motor at all times, the driven element of the secondary clutch being drivingly connected to the spindle at all times, a spring load continuously biasing one element of the release clutch into engagement with the other, the driving element of the release clutch being responsive to a predetermined maximum torque load delivered to the spindle while both clutches are in engagement to overrun the associated driven element against said spring load and to automatically re-engage under the influence of the spring load, and means for acting in response to said overrunning and consequent re-engaging action to separate the driving and driven elements of the secondary clutch clear of one another, the elements of each of the clutches having engageable teeth adapted to enable reversible rotation of the clutches in either direction, the driving element of the release clutch and the driven element of the secondary clutch having splined connections respectively with the motor and with the spindle.

References Cited in the file of this patent

UNITED STATES PATENTS

| 1,611,940 | Ohmer | Dec. 28, 1926 |
| 2,209,155 | Fagg | July 23, 1940 |
| 2,732,746 | Livermont | Jan. 31, 1956 |
| 2,741,352 | Stevens et al. | Apr. 10, 1956 |
| 2,765,890 | Pedersen et al. | Oct. 9, 1956 |
| 2,966,973 | Hayes | Jan. 3, 1961 |

FOREIGN PATENTS

| 796,845 | France | Feb. 3, 1936 |
| 734,432 | Great Britain | Aug. 3, 1955 |

UNITED STATES PATENT OFFICE

CERTIFICATE OF CORRECTION

Patent No. 3,034,623                                May 15, 1962

Lester A. Amtsberg

It is hereby certified that error appears in the above numbered patent requiring correction and that the said Letters Patent should read as corrected below.

Column 3, line 7, for "plate," read -- plate; --; column 4, line 32, after "bore" insert -- 62 --; line 62, for "sperical" read -- spherical --; column 7, line 31, for "radically" read -- radially --; column 9, line 19, for "11" read -- 111 --; column 11, line 32, for "138" read -- 139 --; line 62, for "spined" read -- splined --; column 13, line 35 for "more" read -- move --; line 37, for "rotative" read -- rotation --; column 15, line 40, strike out "of"; column 16, line 37, after "both" insert -- of --.

Signed and sealed this 28th day August 1962.

(SEAL)
Attest:

ESTON G. JOHNSON
Attesting Officer

DAVID L. LADD
Commissioner of Patents